US006424763B1

(12) United States Patent
Villeneuve et al.

(10) Patent No.: US 6,424,763 B1
(45) Date of Patent: Jul. 23, 2002

(54) TUNABLE ADD/DROP FILTER USING SIDE-COUPLED RESONANT TUNNELING

(75) Inventors: Pierre R. Villeneuve, Boston; Shanhui Fan, Somerville; Gale S. Petrich, Arlington; Leslie A. Kolodziejski; John D. Joannopoulos, both of Belmont, all of MA (US)

(73) Assignee: Massachusetts Institute of Technology, Cambridge, MA (US)

(*) Notice: Subject to any disclaimer, the term of this patent is extended or adjusted under 35 U.S.C. 154(b) by 24 days.

(21) Appl. No.: 09/698,305

(22) Filed: Oct. 27, 2000

Related U.S. Application Data

(60) Provisional application No. 60/162,177, filed on Oct. 28, 1999.

(51) Int. Cl.[7] .............................................. G02B 6/42
(52) U.S. Cl. ............................ 385/27; 385/24; 385/39; 385/50
(58) Field of Search ................... 385/9, 15, 16, 385/24, 27, 28, 29, 39, 40, 50, 37, 10, 122, 41, 42; 372/92, 97, 98, 99, 102, 22, 23

(56) References Cited

U.S. PATENT DOCUMENTS 6,101,300 A * 8/2000 Fan et al. ...................... 385/27
6,130,969 A * 10/2000 Villeneuver et al. .......... 385/27

FOREIGN PATENT DOCUMENTS

WO  WO 98 57207 A   12/1998   ............... 385/15 X
WO  WO-98/57207 A1 * 12/1998  ............ G02B/6/34

OTHER PUBLICATIONS

Ivan A. Avrutsky et al., "Design of Widely Tunable Semiconductor Lasers and the Concept of Binary Superimposed Gratings (BSG's)" IEEE Journal of Quantum Electronics, Vol. 34, No. 4, Apr. 1998, pp. 729–741.

Franck Delorme, "Widely Tunable 1.55–$\mu$m Lasers for Wavelength–Division–Multiplexed Optical Fiber Communications," IEEE Journal of Quantum Electronics, vol. 34, No. 9, Sep. 1998, pp. 1706–1716.

H.–P. Gauggel et al., "Wide–Range Tunability of GaInP–AlGaInP DFB Lasers with Superstructure Gratings," IEEE Photonics Technology Letters, vol. 9, No. 1, Jan. 1997, pp. 14–16.

Byoung–Sung Kim et al., "Time–Domain Large–Signal Analysis of Widely Tunable DBR Laser Diodes with Periodically Sampled and Chirped Gratings," IEEE Photonics Technology Letters, vol. 10, No. 1, Jan. 1998 pp. 39–41.

* cited by examiner

Primary Examiner—Brian Healy
Assistant Examiner—Kevin S Wood
(74) Attorney, Agent, or Firm—Samuels, Gauthier & Stevens, LLP

(57) ABSTRACT

A tunable electromagnetic field frequency filter having an input waveguide which carries a signal including at least one desired frequency, and an output waveguide. A resonator-system is coupled to the input and output waveguides and is operable for the selective transfer of the at least one desired frequency to the output waveguide. The resonator-system supports at least two system modes, and includes at least three reflectors with at least two different reflectivity spectra. At least one of the reflectivity spectra is tuned such that at least two of the system-modes have substantially the same frequency when the transfer occurs substantially.

16 Claims, 4 Drawing Sheets

TUNABLE ADD/DROP FILTER USING SIDE-COUPLED RESONANT TUNNELING

PRIORITY INFORMATION

This application claims priority from provisional application Ser. No. 60/162,177 filed Oct. 28, 1999.

BACKGROUND OF THE INVENTION

The invention relates to the field of tunable add/drop filters using side-coupled resonant tunneling.

Add/drop filters play a vital role in wavelength division multiplexed (WDM) lightwave communications systems. They allow different wavelengths to be added or removed from an optical transmission line. Add/drop filters come in one of two classes: static or dynamic. Static devices are designed to operate at a given fixed wavelength predetermined during the fabrication process. Dynamic devices are designed to be switched on and off to add or remove selected wavelengths from a transmission line and, in some cases, are also designed to be tunable, i.e., single devices can be made to add or remove any one of a number of different wavelengths.

Examples of dynamic filters include acousto-optic tunable filters (AOTFs), polymer-based thermo-optic switches, and micro electromechanical systems (MEMS). These filters suffer from a variety of physical limitations such as high crosstalk, frequency insensitivity, and overall large size. This latter feature makes some of the filters unsuitable for very large scale integration (VLSI). In fact, a single AOTF can be as large as one square inch.

Recently, an optical switch based on side-coupled resonant tunneling suitable for VLSI has been designed and described in U.S. Pat. No. 6,101,300 entitled "HIGH EFFICIENCY CHANNEL DROP FILTER WITH ABSORPTION", of common assignee. The switch is activated by changing the internal decaying rate of a resonant coupling element located between two adjacent waveguides. While being very small in size, the switch was designed mostly to add or drop a specific wavelength, determined during fabrication, with limited post-fabrication tunability, i.e., the user could select the wavelength to be added or dropped within only a small range.

SUMMARY OF THE INVENTION

In accordance with the invention, there is provided a tunable add/drop filter capable of selectively adding or dropping one or more wavelength over a wide range of wavelengths. The tuning range can be made large enough to cover the entire bandwidth of a WDM system. The specific wavelength can be selected after fabrication. Post-fabrication tunability over a wide range is a highly desirable feature. It allows, for example, devices to be adjusted during installation. Control signals are adjusted to select a wavelength and the device is left to operate continuously at the selected wavelength, or the device could be electronically and remotely driven to dynamically switch between different wavelengths (such as in optical add/drop multiplexers) allowing fast reconfigurability of optical networks.

The add/drop filter includes two waveguides coupled by an element containing at least two resonators. It is the coupling element that determines the transfer properties of the add/drop filter such as the wavelength of the transferred electromagnetic field. The wavelength of the coupling element in the invention is tunable over a wide range of wavelengths.

In accordance with one embodiment of the invention there is provided a tunable electromagnetic field frequency filter having an input waveguide which carries a signal including at least one desired frequency, and an output waveguide. A resonator-system is coupled to the input and output waveguides operable for the selective transfer of the at least one desired frequency to the output waveguide. The resonator-system supports at least two system modes, and includes at least three reflectors with at least two different reflectivity spectra. At least one of the reflectivity spectra is tuned such that at least two of the system-modes have substantially the same frequency when the transfer occurs substantially.

DETAILED DESCRIPTION OF THE INVENTION

Figure 1:
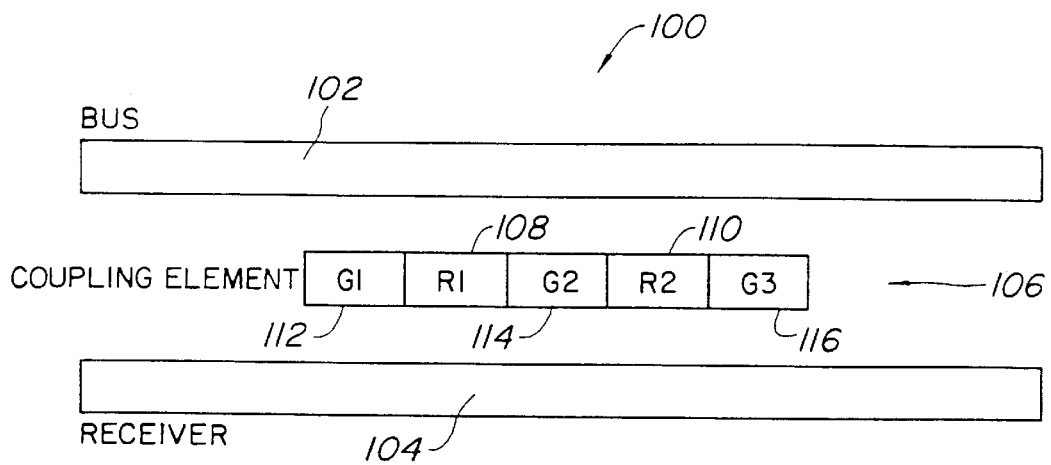
FIG. 1 is a schematic diagram of a tunable add/drop filter in accordance with the invention.

FIG. 1 is a schematic diagram of a tunable add/drop filter 100 in accordance with the invention. The filter includes two waveguides that are labeled "bus" 102 and "receiver" 104. A coupling element 106 has a resonator system comprising two resonators, labeled R1 (108) and R2 (110). The resonators are defined using three gratings, labeled G1 (112), G2 (114), and G3 (116). The reflectivity spectra of the gratings consist of combs of reflection peaks, i.e., series of discrete frequency regions of high reflectivity separated by regions of low reflectivity. Examples of gratings include, but are not limited to, sampled gratings, chirped gratings, and superstructure gratings. Some examples are shown in the following two references: "Tunable Laser Diodes" by M. C. Amann and J. Buus, published by Artech, Boston (1998); and "Design of Widely Tunable Semiconductor Lasers and Concept of Binary Superimposed Gratings (BSG's)" by I. Avrutsky, D. Ellis, A. Tager, H. Anis and J. Xu, published in IEEE J. Quant. Elect., vol. 34, no. 4, pp. 729–741 (1998), both of which are incorporated herein by reference.

The two resonators are coupled through grating G2 and are further coupled through the waveguides. Each resonator supports at least one mode and the resonator system supports at least two system modes. The system modes are eigenmodes of the resonator system formed in part by a linear combination of the resonator modes. Substantial transfer occurs between the bus and the receiver when the two system modes have substantially the same resonant frequency and the same overall decay rate. However, the invention does not necessarily have a plane of symmetry perpendicular to the waveguides. The wavelength of the transferred signal is selected by changing the resonant frequency of the resonators. This is accomplished by changing the reflectivity spectrum of the gratings and by adjusting the round-trip path length inside the resonators to insure resonance. The reflectivity and the round-trip path length can be adjusted, for example, using a variety of physical phenomena such as carrier injection, thermal heating, or the electro-optic effect.

Figure 2A:
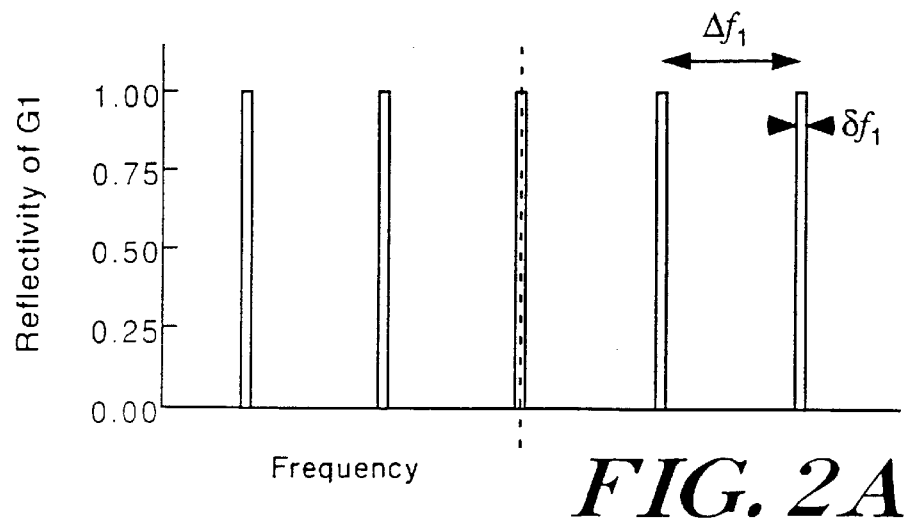
FIGS. 2A–2C are schematic graphs of the reflectivity spectra of the three gratings shown in FIG. 1.
Figure 2B:
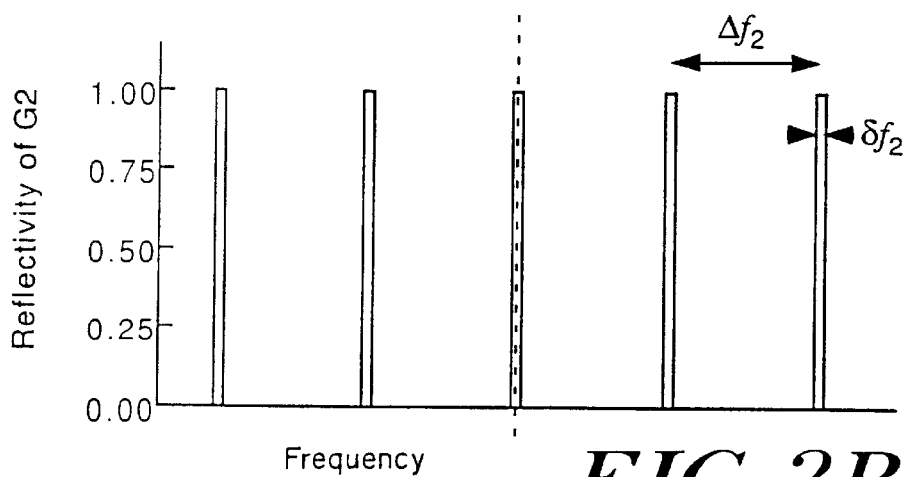
Figure 2C:
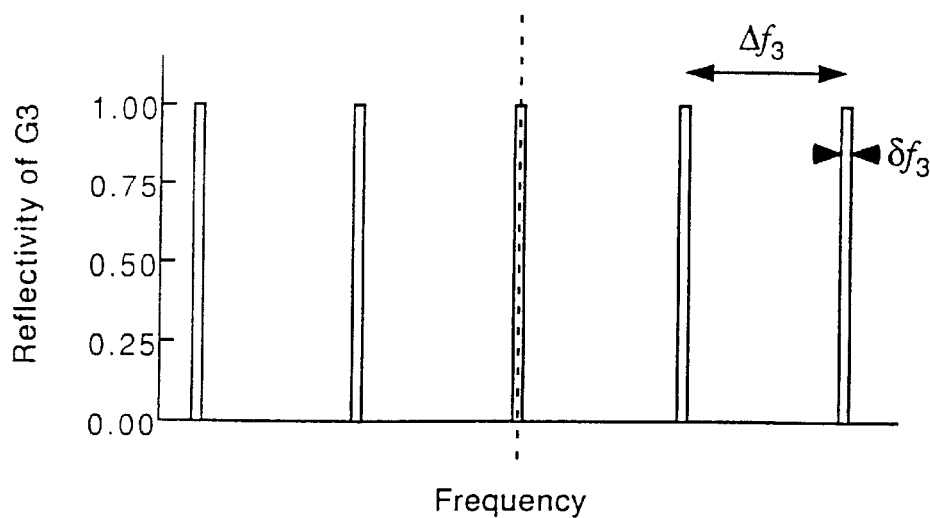

The comb-like reflectivity spectra of the three gratings are shown schematically in the graphs of FIGS. 2A–2C. Each spectrum consists of a series of reflection peaks separated by a different frequency spacing $\Delta f_i$ (i=1, 2, or 3). The features of the reflectivity spectra depend on the physical parameters of the gratings; each grating has a different set of physical parameters. Since each grating has a different frequency spacing, it is possible to align one reflection peak from each grating, i.e., all three gratings have a reflection peak at the same frequency, while keeping all other reflection peaks misaligned. Tuning is accomplished by frequency shifting at least one of the reflection spectra.

Only small frequency shifts are needed to misalign the reflectivity peaks. Moreover, other peaks can be made to coincide resulting in the resonators being resonant at a different frequency. This effect, called the Vernier effect, is used to tune the filter over a wide frequency range while using only small frequency shifts. It is used in certain tunable laser sources for WDM applications. See, for example, "Widely tunable 1.55-$\mu$m lasers for wavelength-division-multiplexed optical fiber communications", F. Delorme, IEEE J. Quant. Electron., Vol. 34, pp.1706–1716 (1998), incorporated herein by reference.

The coupling of the two resonators through G2 (the "direct" coupling) causes frequency splitting of the two system modes. This direct coupling is compensated by "indirect" coupling through the waveguides. The indirect coupling depends on the optical path length between the resonators which in turn depends on the frequency of the resonant modes. In order to guarantee cancellation of direct and indirect coupling for any frequency, it is necessary to adjust the phase of the signal in the waveguides. This can be accomplished, for example, using the electro-optic effect.

Figure 3:
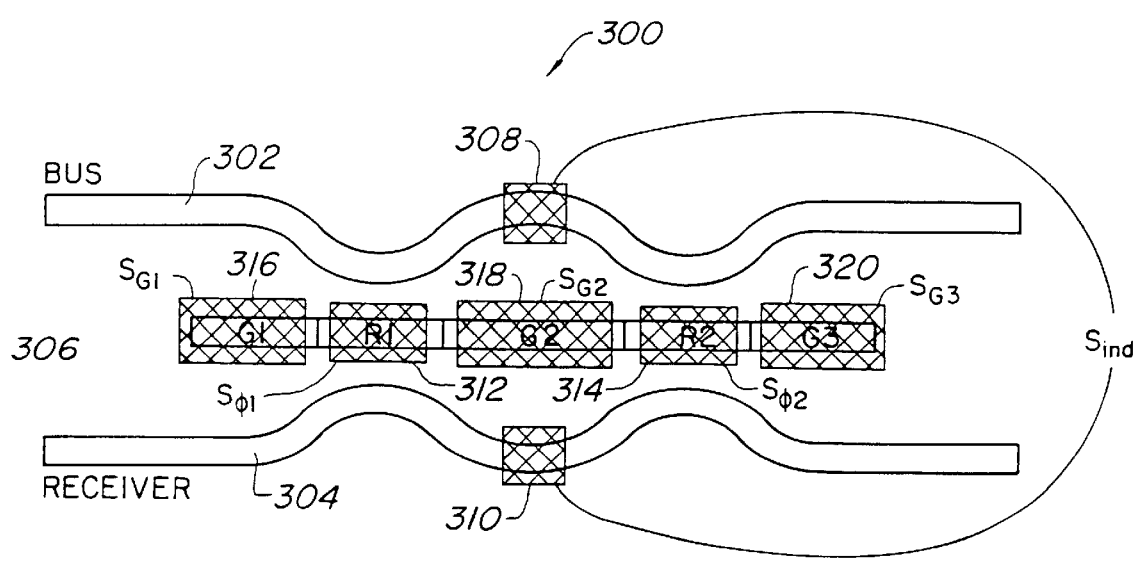
FIG. 3 is a plan view of a first exemplary embodiment of the invention.

FIG. 3 is a plan view of an exemplary embodiment of a tunable add/drop filter 300 of the invention. The filter includes two waveguides that are labeled bus 302 and receiver 304. The filter includes a coupling element 306 having a resonator system comprising two resonators, labeled R1 and R2. The resonators are defined using three gratings, labeled G1, G2, and G3. In this embodiment, the waveguides (both the bus and the receiver) are curved to minimize the transfer of non-resonant channels occurring through waveguide coupling, and back reflection from the gratings. The cross-hatched regions correspond to metal electrodes 308, 310 located above the waveguides, and metal electrodes 312, 314, 316, 318, 320 located above the resonators and gratings, respectively. In this exemplary embodiment, a voltage is applied to each electrode to change the optical properties of the materials. There are six control signals:

$S_{G1}$, $S_{G2}$, and $S_{G3}$ are used to shift the reflectivity spectra of G1, G2, and G3, respectively, hence are used to select (tune) the desired channel;

$S_{\phi 1}$ and $S_{\phi 2}$ are used to satisfy the round-trip resonant condition in each resonator; and $S_{ind}$ is used to satisfy the cancellation of direct and indirect coupling between the resonators.

Alternatively, the filter could be operated by shifting only two reflectivity spectra, leaving the third unaffected. One reflectivity spectrum could be aligned with the standard International Telecommunication Union (ITU) grid, though this is not necessary to meet ITU standards. Also, $S_{ind}$ could be driven with two separate sources.

In the exemplary embodiment shown in FIG. 3, each resonator has a single resonant mode within the frequency range $\delta f_i$, where $\delta f_i$ is defined as the width of the reflection peaks of grating i. The optical resonant modes extend spatially in (and beyond) the resonators over a total length L. L is the effective length of the resonators and is different than the physical length of the resonator. The frequency spacing Df between two adjacent resonant frequencies is given by:

$$Df = c/(Ln_{eff})$$

where $n_{eff}$ is the effective index of refraction of the materials in the resonator region. The product $Ln_{eff}$ is defined as the optical length of the resonators. Since the resonators support only one resonant mode within the frequency range $\delta f_i$, $\delta f_i$ must be smaller than Df. This sets an upper limit on the effective length of the resonators:

$$L < c/(2n_{eff}\delta f_i)$$

In the specific case where $n_{eff}=3$ and $\delta f_1 = \delta f_2 = \delta f_3 = 10$ GHz, the effective length of the resonator must be less than 5 mm.

The frequency spacing $\Delta f_i$ of the different reflection peaks is given by:

$$\Delta f_i = c/(2l_i n_{eff,i})$$

where $l_i$ is the length of the repeating unit of grating i, $n_{eff,i}$ is the effective index of grating i, and $l_i n_{eff,i}$ defines the optical length of the i-th reflector. In the specific case where $n_{eff,2}=3$ and $\Delta f_2 = 100$ GHz, the length of the repeating unit of grating 2 is 500 $\mu$m. The frequency spacing can be modified by changing the length of the grating.

In another embodiment, the width of the reflection peaks is made larger such that it overlaps with more than one frequency channel. In this embodiment, multiple channels are transferred between the two waveguides simultaneously.

Figure 4:
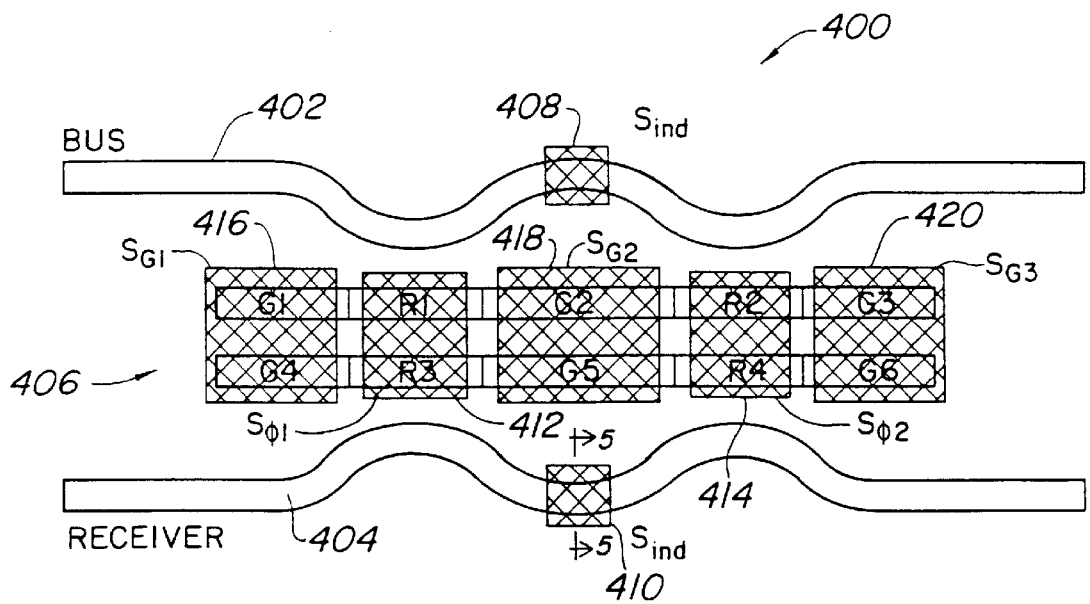
FIG. 4 is a plan view of a second exemplary embodiment of the invention.

FIG. 4 is a plan view of another exemplary embodiment of a tunable add/drop filter 400. The filter includes two waveguides that are labeled bus 402 and receiver 404. The filter includes a coupling element 406 having a resonator system comprising four resonators, labeled R1–R4. The resonators are defined using six gratings, labeled G1–G6. In this embodiment, the waveguides (both the bus and the receiver) are curved to minimize the transfer of non-resonant channels occurring through waveguide coupling, and back reflection from the gratings. The cross-hatched regions correspond to metal electrodes 408, 410 located above the waveguides, and metal electrodes 412, 414, 416, 418, 420 located above the resonators and gratings, respectively. In this exemplary embodiment, a voltage is applied to each electrode to change the optical properties of the materials.

As in the previous embodiment there is a total of seven metal electrodes. While the use of two resonators in the previous embodiment resulted in a Lorentzian-shaped transfer function, the presence of four resonators in the current embodiment results in a non-Lorentzian transfer lineshape. The use of four resonators has the advantage of generating "flat top" and "sharp sidewall" response characteristics. Additional resonator pairs could be added to this embodiment to further modify the transfer lineshape.

Figure 5:
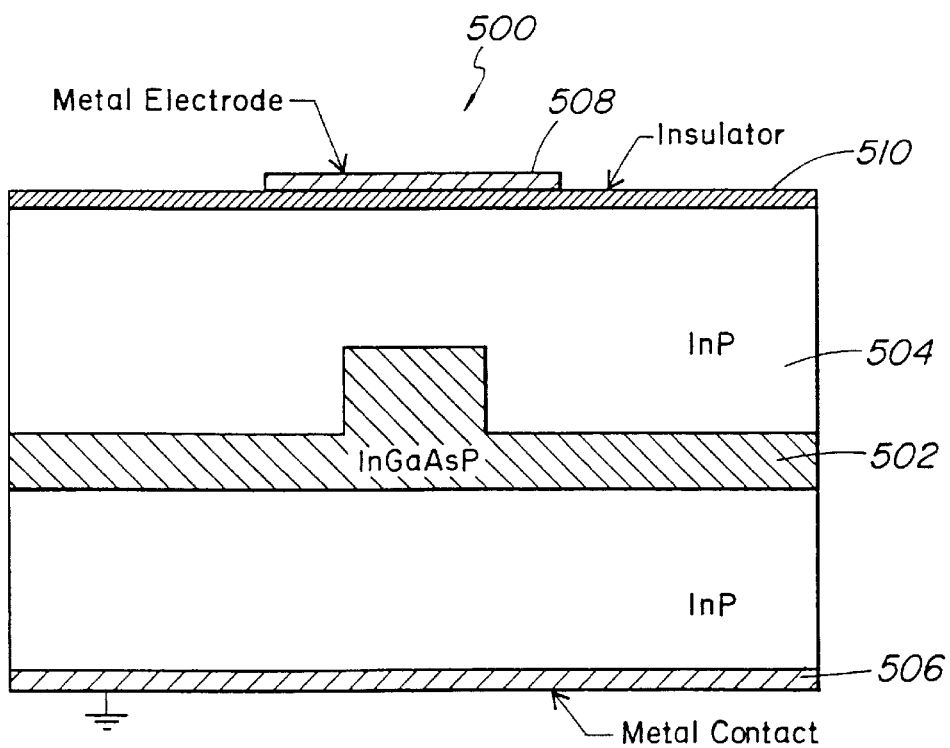
FIG. 5 is a cross sectional view of the waveguide shown in FIG. 4 along the dashed line 5—5 in which the device is tuned using the electro-optic effect.

The tunable add/drop filter presented in this disclosure can be fabricated in any of a large number of material systems such as III–V or II–VI compound semiconductors, or Si-based material systems. FIG. 5 shows the cross section of an exemplary embodiment of a waveguide 500 as represented along dashed line 5—5 of FIG. 4. FIG. 5 shows an InGaAsP ridge waveguide 502 buried in an InP substrate 504, with a backside metal contact 506. However, it will be appreciated by those skilled in the art that other waveguide geometries and other material systems can also be used. A metal electrode 508 is deposited on top of an insulating layer 510. FIG. 5 illustrates a configuration for adjusting the device using the electro-optic effect.

Figure 6:
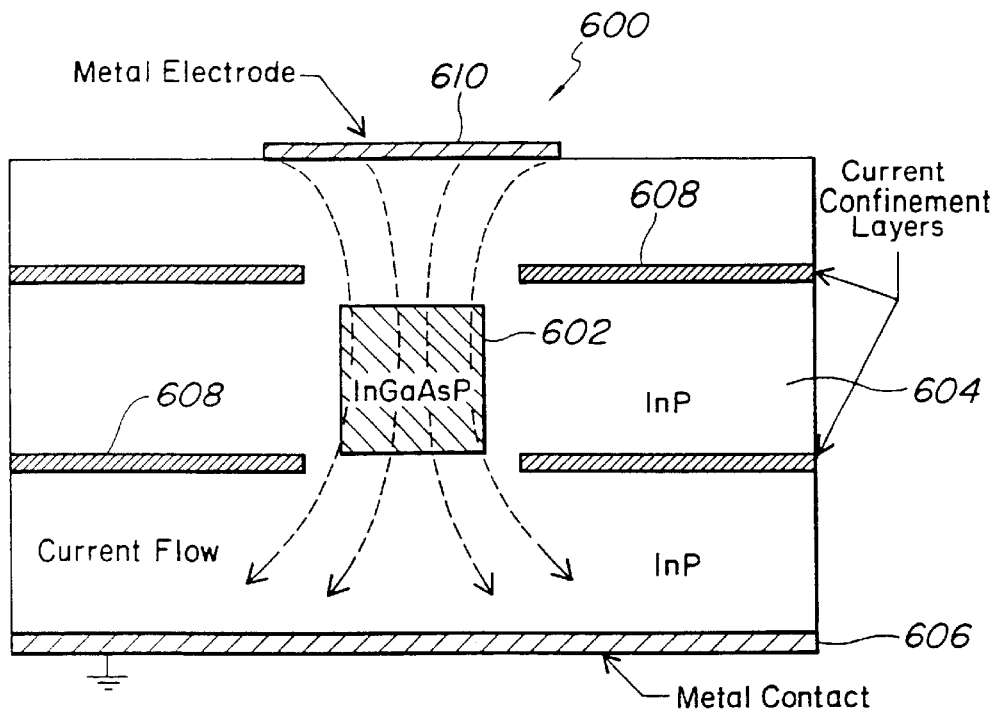
FIG. 6 is a cross sectional view of the waveguide shown in FIG. 4 along the dashed line 5—5 in which the device is tuned using the injection of charge carriers.

FIG. 6 is a cross section of another exemplary embodiment of a waveguide 600 taken along dashed line 5—5 of FIG. 4. FIG. 6 illustrates a configuration for tuning the device using the injection of charge carriers. Waveguide 600 includes an InGaAsP waveguide 602 buried in an InP substrate 604, with a backside metal contact 606. In this embodiment, an uppermost insulating layer is omitted and optional current-confinement layers 608 are added to help confine the carriers in the area of the waveguide. Furthermore, in this specific embodiment, doped semiconductors are used to promote current injection. A metal electrode 610 is deposited on the surface.

Figure 7:
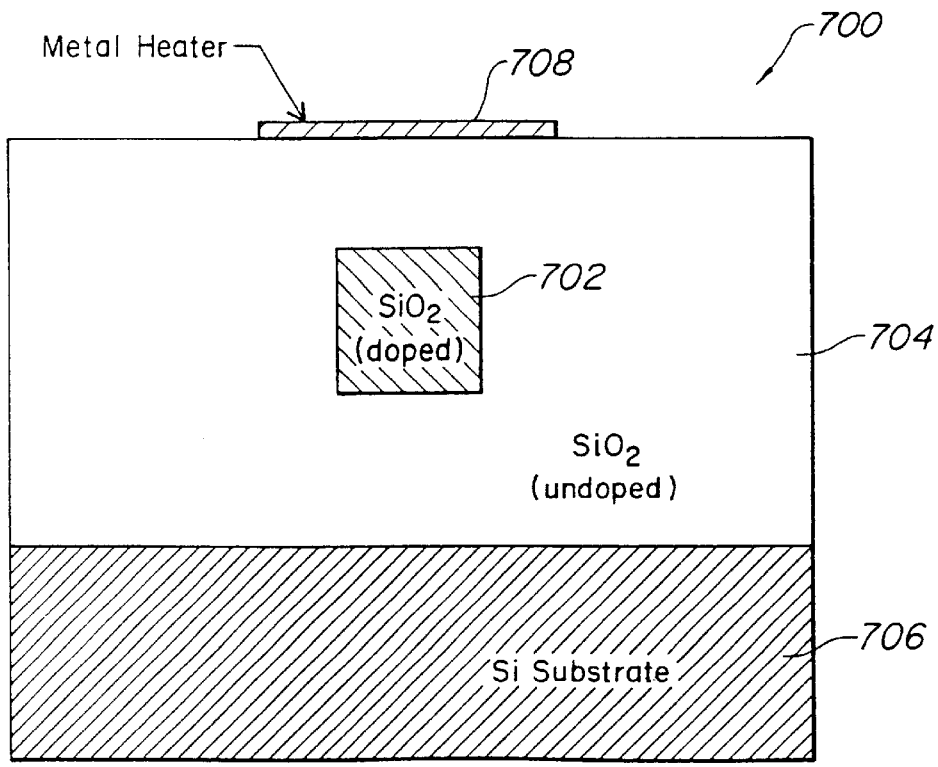
FIG. 7 is a cross sectional view of the waveguide shown in FIG. 4 along the dashed line 5—5 in which the device is tuned using the thermo-optic effect.

In yet another embodiment, the device is tuned using the thermo-optic effect. FIG. 7 is a cross section of an exemplary embodiment of a waveguide 700 taken along dashed line 5—5 of FIG. 4. A waveguide 702 of doped $SiO_2$ is buried in a layer 704 of undoped $SiO_2$, which is provided on a Si substrate 706. In this embodiment, resistive metal heaters 708 are used to locally change the material temperature, hence the index of refraction. Although the thermal effect is generally slower than the electroabsorption and electro-optic effects, i.e., the tuning speed is lower, the device retains its large range of tunability.

Although the present invention has been shown and described with respect to several preferred embodiments thereof, various changes, omissions and additions to the form and detail thereof, may be made therein, without departing from the spirit and scope of the invention.

What is claimed is:

1. A tunable electromagnetic field frequency filter comprising:
   an input waveguide which carries a signal having at least one frequency including at least one desired frequency;
   an output waveguide; and
   a resonator-system coupled to said input and output waveguides operable for the selective transfer of said at least one desired frequency to said output waveguide, said resonator-system supporting at least two system modes, said resonator-system comprising at least three reflectors with at least two different reflectivity spectra, at least one of said reflectivity spectra being tuned such that at least two of said system-modes have substantially the same frequency when said transfer occurs substantially.

2. The filter of claim 1, wherein said reflectivity spectra comprise regions of high reflectivity with narrow bandwidths.

3. The filter of claim 2, wherein said regions of high reflectivity are in close proximity to said desired signal frequency when said transfer occurs substantially.

4. The filter of claim 1, wherein said reflectors comprise periodic gratings.

5. The filter of claim 4, wherein said gratings have sampled periodicity, super-structure periodicity, modulated periodicity, or chirped periodicity.

6. The filter of claim 4, wherein said periodic gratings produce reflectivity spectra with regions of high reflectivity with narrow bandwidths.

7. The filter of claim 1, wherein said at least one reflectivity spectrum is tuned by changing the optical length of the reflector.

8. The filter of claim 7, wherein said optical length is changed by changing the refractive index or physical length of the reflector.

9. The filter of claim 7, wherein said optical length is changed by employing an electric, optical, electro-optic or thermal effect.

10. The filter of claim 7, wherein said optical length is changed by injecting carriers or by applying an electric field.

11. The filter of claim 8, wherein said refractive index or physical length is changed by changing temperature.

12. The filter of claim 1, wherein said resonator-system comprises at least one pair of resonators that couple directly with said input waveguide and not directly with said output waveguide.

13. The filter of claim 1, wherein said resonator-system comprises at least one pair of resonators that couple directly with said output waveguide and not directly with said input waveguide.

14. The filter of claim 1, wherein said resonator-system comprises at least one pair of resonators that do not couple directly with either said input or output waveguides.

15. The filter of claim 2, wherein the optical length of the resonators are tuned such that the frequencies of said system modes lie within said regions of high reflectivity when said transfer occurs substantially.

16. A method of selectively transferring electromagnetic fields between two waveguides comprising:
   providing an input waveguide which carries a signal having at least one frequency including at least one desired frequency, and an output waveguide; and
   coupling a resonator-system to said input and output waveguides, said resonator-system supporting at least two system modes, said resonator-system comprising at least three reflectors with at least two different reflectivity spectra, at least one of said reflectivity spectra being tuned such that at least two of said system-modes have substantially the same frequency when said transfer occurs substantially.

* * * * *

UNITED STATES PATENT AND TRADEMARK OFFICE
CERTIFICATE OF CORRECTION

PATENT NO. : 6,424,763 B1
DATED : July 23, 2002
INVENTOR(S) : Villeneuve et al.

It is certified that error appears in the above-identified patent and that said Letters Patent is hereby corrected as shown below:

<u>Column 1,</u>
Line 8, please add the following:

-- SPONSORSHIP INFORMATION
   This invention was made with government support under Grant Number DMR-9808941, awarded by NSF. The government has certain rights in the invention. --

Signed and Sealed this

First Day of October, 2002

*Attest:*

*Attesting Officer*

JAMES E. ROGAN
*Director of the United States Patent and Trademark Office*